United States Patent
He et al.

(10) Patent No.: US 10,461,321 B2
(45) Date of Patent: Oct. 29, 2019

(54) ALKALI METAL-SULFUR SECONDARY BATTERY CONTAINING A PRE-SULFURIZED CATHODE AND PRODUCTION PROCESS

(71) Applicant: Nanotek Instruments, Inc., Dayton, OH (US)

(72) Inventors: Hui He, Dayton, OH (US); Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 517 days.

(21) Appl. No.: 14/544,760

(22) Filed: Feb. 18, 2015

(65) Prior Publication Data

US 2016/0240840 A1    Aug. 18, 2016

(51) Int. Cl.
*H01M 4/36* (2006.01)
*H01M 4/136* (2010.01)
(Continued)

(52) U.S. Cl.
CPC ............ *H01M 4/366* (2013.01); *H01M 4/13* (2013.01); *H01M 4/136* (2013.01); *H01M 4/381* (2013.01); *H01M 4/382* (2013.01); *H01M 4/387* (2013.01); *H01M 4/463* (2013.01); *H01M 4/5815* (2013.01); *H01M 10/052* (2013.01); *H01M 10/054* (2013.01); *H01M 10/0525* (2013.01); *H01M 10/0565* (2013.01); *H01M 10/0567* (2013.01); *H01M 10/0568* (2013.01); *H01M 10/0569* (2013.01); *H01M 2004/027* (2013.01); *H01M 2004/028* (2013.01);
(Continued)

(58) Field of Classification Search
None
See application file for complete search history.

(56) References Cited

U.S. PATENT DOCUMENTS 7,071,258 B1    7/2006    Jang et al.
9,034,421 B2    5/2015    Mikhaylik et al.
(Continued)

OTHER PUBLICATIONS

U.S. Appl. No. 10/858,814, filed Jun. 3, 2004, B. Z. Jang, et al.
(Continued)

*Primary Examiner* — Wyatt P McConnell

(57) ABSTRACT

A method of producing a pre-sulfurized active cathode layer for a rechargeable alkali metal-sulfur cell; the method comprising: (a) Preparing an integral layer of meso-porous structure of a carbon, graphite, metal, or conductive polymer having a specific surface area greater than 100 $m^2/g$; (b) Preparing an electrolyte comprising a solvent and a sulfur source; (c) Preparing an anode; and (d) Bringing the integral layer and the anode in ionic contact with the electrolyte and imposing an electric current between the anode and the integral layer (serving as a cathode) to electrochemically deposit nano-scaled sulfur particles or coating on the graphene surfaces. The sulfur particles or coating have a thickness or diameter smaller than 20 nm (preferably <10 nm, more preferably <5 nm or even <3 nm) and occupy a weight fraction of at least 70% (preferably >90% or even >95%).

16 Claims, 6 Drawing Sheets

(51) Int. Cl.
*H01M 4/38* (2006.01)
*H01M 10/0565* (2010.01)
*H01M 10/0567* (2010.01)
*H01M 10/0569* (2010.01)
*H01M 4/46* (2006.01)
*H01M 10/0525* (2010.01)
*H01M 10/054* (2010.01)
*H01M 4/13* (2010.01)
*H01M 4/58* (2010.01)
*H01M 10/052* (2010.01)
*H01M 10/0568* (2010.01)
*H01M 4/02* (2006.01)

(52) U.S. Cl.
CPC .............. *H01M 2300/0025* (2013.01); *H01M 2300/0034* (2013.01); *H01M 2300/0082* (2013.01)

(56) References Cited

U.S. PATENT DOCUMENTS

| | | | |
|---|---|---|---|
| 2003/0198870 A1* | 10/2003 | Wariishi | H01M 4/5815 429/313 |
| 2004/0081894 A1* | 4/2004 | Nimon | H01M 4/06 429/326 |
| 2005/0191554 A1* | 9/2005 | Soga | B82Y 30/00 429/232 |
| 2005/0271574 A1 | 12/2005 | Jang et al. | |
| 2008/0048152 A1* | 2/2008 | Jang | B82Y 30/00 252/378 R |
| 2009/0286163 A1* | 11/2009 | Shin | H01M 4/5815 429/315 |
| 2012/0088154 A1 | 4/2012 | Liu et al. | |
| 2013/0171339 A1 | 7/2013 | Wang et al. | |
| 2014/0234702 A1 | 8/2014 | Zhang et al. | |
| 2014/0322584 A1* | 10/2014 | Visco | H01M 8/188 429/122 |

OTHER PUBLICATIONS

U.S. Appl. No. 11/509,424, filed Aug. 25, 2006, B. Z. Jang, et al.
U.S. Appl. No. 14/544,765 Final Office Action dated Apr. 5, 2018, 10 pages.
U.S. Appl. No. 14/544,765 Nonfinal Office Action dated Oct. 6, 2017, 11 pages.
Ji et al., "A Highly Ordered Nanostructured Carbon-Sulphur Cathode for Lithium-Sulphur Batteries" Nature Materials (2009) vol. 8, pp. 500-506.##.

* cited by examiner

ALKALI METAL-SULFUR SECONDARY BATTERY CONTAINING A PRE-SULFURIZED CATHODE AND PRODUCTION PROCESS

FIELD OF THE INVENTION

The present invention provides a unique cathode composition and structure in a secondary or rechargeable alkali metal-sulfur battery, including the lithium-sulfur battery, sodium-sulfur battery, and potassium-sulfur battery. The lithium-sulfur battery can include the lithium metal-sulfur battery (having lithium metal as the anode active material and sulfur as the cathode active material) and the lithium ion-sulfur battery (e.g. Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^\circ$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.

(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.

(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g(S wt.) at 0.1 C rate, dropped to <580 mAh/g at 1.0 C rate). Again, this implies that a large proportion of S did not contribute to the lithium storage, resulting in a low S utilization efficiency.

Furthermore, all of the aforementioned methods involve depositing S particles onto surfaces of isolated graphene sheets. The presence of S particles (one of the most insulating materials) adhered to graphene surfaces would make the resulting electrode structure non-conducting when multiple S-bonded graphene sheets are packed together. These S particles prevent graphene sheets from contacting each other, making it impossible for otherwise conducting graphene sheets to form a 3-D network of electron-conducting paths in the cathode. This unintended and unexpected outcome is another reason why these prior art Li—S cells have performed so poorly.

Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electroactive cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, and more preferably greater than 600 Wh/Kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) dissolution of S and alkali metal polysulfide in electrolyte and migration of polysulfides from the cathode to the anode (which irreversibly react with lithium, or Na or K at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential alkali metal dendrite-induced internal short circuit and thermal runaway problems in Li metal-sulfur batteries.

SUMMARY OF THE INVENTION

The present invention provides an electrochemical method of producing a pre-sulfurized active cathode layer for use in a rechargeable alkali metal-sulfur cell (e.g. lithium-sulfur cell, sodium-sulfur cell, and potassium-sulfur cell). Such an electrochemical method is surprisingly capable of uniformly depositing an ultra-thin sulfur (S) coating layer or ultra-small small S particles (<20 nm, more preferably and typically <10 nm, most typically and preferably <5 nm, or even <3 nm) in meso pores (2-50 nm), yet achieving a large proportion of S (the cathode active material) relative to the supporting substrate (meso-porous structure). The ultra-thin dimensions also enable high storing/releasing rates of alkali metal ions ($Li^+$, $Na^+$, and/or $K^+$) and, hence, exceptional rate capability or power density.

For the purpose of describing the preferred embodiments of the instant invention, Li ions, Li metal, and Li—S cells are used as examples. But, the same or similar procedures are applicable to other alkali metal ions, alkali metals and alkali metal-sulfur cells (e.g. Na—S cells and K—S cells). This method comprises the following four elements, (a)-(d):
  a) Preparing an integral layer of meso-porous graphene structure having meso-scaled pores (2-50 nm) and massive surfaces with a specific surface area greater than 100 $m^2/g$. The porous graphene structure has a specific surface area preferably >500 $m^2/g$ and more preferably >750 $m^2/g$, and most preferably >1,000 $m^2/g$.

The integral layer of a meso-porous structure is composed of primarily a carbon, graphite, metal, or conductive polymer selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, activated meso-phase carbon, meso-porous carbon, electro-spun conductive nano fiber, highly separated vapor-grown carbon or graphite nano fibers (to ensure a specific surface area >100 $m^2/g$ even after these fibers are packed together), carbon or graphite whisker, carbon nano-tube, carbon nanowire, metal nano wire, metal-coated nanowire or nano-fiber, conductive polymer-coated nanowire or nano-fiber, or a combination thereof.

These materials, in a particulate or fibrous form, along with the optional binder material (0-10% by weight), are combined to form a meso-porous structure that must still have a specific surface area greater than 100 $m^2/g$ (preferably >500 $m^2/g$ and more preferably >750 $m^2/g$, and most preferably >1,000 $m^2/g$).

The layer of meso-porous graphene structure contains 0-49% (preferably 0-30%, more preferably 0-20%, and further preferably 0-10%) by weight of sulfur or sulfur-containing compound pre-loaded therein prior to the current electrochemical deposition), based on the total weights of all ingredients in the layer. Although not preferred, one can pre-load 0.01% to 49% of S in the meso-porous structure.

b) Preparing an electrolyte comprising a solvent (preferably non-aqueous solvent such as organic solvent and/or ionic liquid) and a sulfur source dissolved or dispersed in the solvent;

c) Preparing an anode (this anode layer can be an anode active material layer in an intended alkali metal-sulfur cell or an electrode in an external chamber/reactor that is external or unrelated to the intended alkali metal-sulfur cell); and d) Bringing the integral layer of meso-porous structure and the anode in ionic contact with the electrolyte (e.g. immersing all these components in a chamber or reactor being external to the intended alkali metal-sulfur cell, or encasing these three components inside the battery cell) and imposing an electric current between the anode and the integral layer of meso-porous structure (serving as a cathode) with a sufficient current density for a sufficient period of time to electrochemically deposit nano-scaled sulfur particles or coating in the meso-scaled pores to form the pre-sulfurized active cathode layer, wherein the particles or coating have a thickness or diameter smaller than 20 nm (preferably <10 nm, more preferably <5 nm, and further preferably <3 nm) and wherein the nano-scaled sulfur particles or coating occupy a weight fraction of preferably at least 70% (more preferably >80%, even more preferably >90%, and most preferably >95%)

based on the total weights of the sulfur particles or coating and the meso-porous structure combined.

When these three components (the meso-porous structure, anode, and electrolyte) are encased inside the intended alkali metal-sulfur cell, nano sulfur is electrochemically deposited in situ in the cathode inside the battery cell. When the three components are implemented in an external container (chamber or reactor outside of the intended battery cell), nano sulfur is deposited in the meso-scaled pores through the "external electrochemical deposition" route.

In one preferred embodiment, the sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In one embodiment, the anode comprises an anode active material selected from an alkali metal, an alkaline metal, a transition metal, a metal from groups 13 to 17 of the periodic table, or a combination thereof.

In one embodiment, the method further comprises a procedure of depositing an element Z in the meso-porous structure wherein element Z is mixed with sulfur or formed as discrete Z coating or particles having a dimension less than 100 nm (preferably <20 nm, further preferably <10 nm, even more preferably <5 nm, and most preferably <3 nm) and Z element is selected from Sn, Sb, Bi, Se, and/or Te. The procedure of depositing element Z may be preferably selected from electrochemical deposition, chemical deposition, or solution deposition. We have discovered that the addition of some amount (less than 50%, preferably less than 20% by weight) of Sn, Sb, Bi, Se, or Te can not only lead to improved cathode conductivity but also enhanced specific capacity.

The electrolyte may further comprise an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

In one preferred embodiment, the electrochemical deposition is conducted before the cathode active layer is incorporated into an intended alkali metal-sulfur battery cell (e.g. Li—S, Na—S cell, or K—S cell). In other words, the anode, the electrolyte, and the integral layer of porous graphene structure (serving as a cathode layer) are disposed in an external container outside of a lithium-sulfur battery cell. The needed apparatus is similar to an electro-plating system. The step of electrochemically depositing nano-scaled sulfur particles or coating in the meso pores is conducted outside the intended alkali metal-sulfur cell and prior to the battery cell fabrication.

In another embodiment, the anode, the electrolyte, and the integral layer of meso-porous structure are disposed inside an alkali metal-sulfur cell (e.g. lithium-sulfur cell). In other words, the battery cell itself is an electrochemical deposition system for pre-sulfurization of the cathode and the step of electrochemically depositing nano-scaled sulfur particles or coating occurs after the battery cell is fabricated. This electrochemical deposition procedure is conducted during the first charge cycle of the Li—S, Na—S, or K—S cell.

A special and highly advantageous feature of the inventive method is the notion that this method enables the sulfur to be deposited in a thin coating or ultra-fine particle form (thus, providing ultra-short lithium ion diffusion paths and, hence, ultra-fast reaction times for fast battery charges and discharges) while achieving a relatively high proportion of sulfur (the active material responsible for storing lithium) and, thus, high specific lithium (or Na or K) storage capacity of the resulting cathode active layer in terms of high mAh/g (based on the total weight of the cathode layer, including the masses of the active material, S, supporting substrate material, optional binder resin, and optional conductive filler combined). It is of significance to note that one might be able to use a prior art procedure to deposit small S particles, but cannot achieve a high S proportion at the same time, or to achieve a high proportion of S, but only in large particles or thick coating form. All the prior art procedures have not been able to achieve both at the same time.

It is highly advantageous to achieve a high sulfur loading and yet, concurrently, form an ultra-thin coating or ultra-small diameter particles of sulfur in terms of maximizing both the energy density and power density of a battery cell. This has not been possible with any prior art sulfur loading techniques. For instance, we have been able to deposit nano-scaled sulfur particles or coating that occupy a >90% weight fraction of the cathode layer and yet maintain a coating thickness or particle diameter <3 nm. This is quite a feat in the art of lithium-sulfur, sodium-sulfur, or potassium-sulfur batteries. In another example, we have achieved a >95% S loading at an average S coating thickness of 4.8-7 nm. These ultra-thin dimensions (3-7 nm) enable facile cathode reactions and nearly perfect sulfur utilization efficiency, something that no prior worker has been able to achieve.

The present invention also provides a pre-sulfurized active cathode layer produced by the above-described method and a rechargeable alkali metal-sulfur cell that contains such a cathode layer. Typically, such a rechargeable alkali metal-sulfur cell comprises an anode active material layer, an optional anode current collector, a porous separator and/or an electrolyte, a pre-sulfurized active cathode layer, and an optional cathode current collector.

In the invented rechargeable alkali metal-sulfur cell, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte preferably contains an alkali metal salt (lithium salt, sodium salt, and/or potassium salt) selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$, Lithium bis(oxalato)borate (LiBOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature. Common cations of RTILs include, but not limited to, Tetraalkylammonium, Di-, Tri-, or Tetraalkylimidazolium, Alkylpyridinium, Dialkylpyrrolidinium, Dialkylpiperidinium, Tetraalkylphosphonium, and Trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc.

As examples, the solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In an embodiment, the rechargeable alkali metal-sulfur cell may further comprise a layer of protective material disposed between the anode and the porous separator, wherein the protective material is a conductor to the intended alkali metal ions (e.g. $Li^+$, $Na^+$, or $K^+$). In a preferred embodiment, the protective material consists of a solid electrolyte.

In an embodiment, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof. This anode active material layer can be optionally coated on an anode current collector (such as Cu foil).

In another embodiment, the lithium-sulfur battery cell is an alkali metal ion-sulfur cell (e.g. lithium ion-sulfur cell, sodium-ion sulfur cell, potassium ion-sulfur cell) wherein the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe) and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

We have discovered that the use of these types of anode active materials (instead of lithium metal foil or sodium particles, for instance)) can eliminates the dendrite issue. The resulting battery cells are herein referred to as lithium ion sulfur cells or sodium ion sulfur cell, two new breeds of alkali metal-sulfur cells.

In the rechargeable alkali metal-sulfur cell, the binder material (if desired) is selected from a resin, a conductive polymer, coal tar pitch, petroleum pitch, meso-phase pitch, coke, or a derivative thereof.

In the rechargeable alkali metal-sulfur cell, the cathode may further comprise additional sulfur, sulfur-containing molecule, sulfur-containing compound, sulfur-carbon polymer, or a combination thereof, which is loaded before the cell is manufactured.

The presently invented cell provides a reversible specific capacity of typically no less than 800 mAh per gram based on the total weight of the integral cathode layer (the weights of S, graphene material, optional binder, and optional conductive filler combined), not just based on the active material weight (sulfur) only. Most of the scientific papers and patent documents reported their sulfur cathode specific capacity data based on sulfur weight only.

More typically and preferably, the reversible specific capacity is no less than 1,000 mAh per gram and often exceeds 1,200 or even 1,500 mAh per gram of entire cathode layer. The high specific capacity of the presently invented cathode, when in combination with a lithium anode, leads to a cell specific energy of no less than 600 Wh/Kg based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 500 Wh/Kg and, in some examples, exceeds 600 Wh/kg.

These and other advantages and features of the present invention will become more transparent with the description of the following best mode practice and illustrative examples.

DETAILED DESCRIPTION OF PREFERRED EMBODIMENTS

Figure 1:
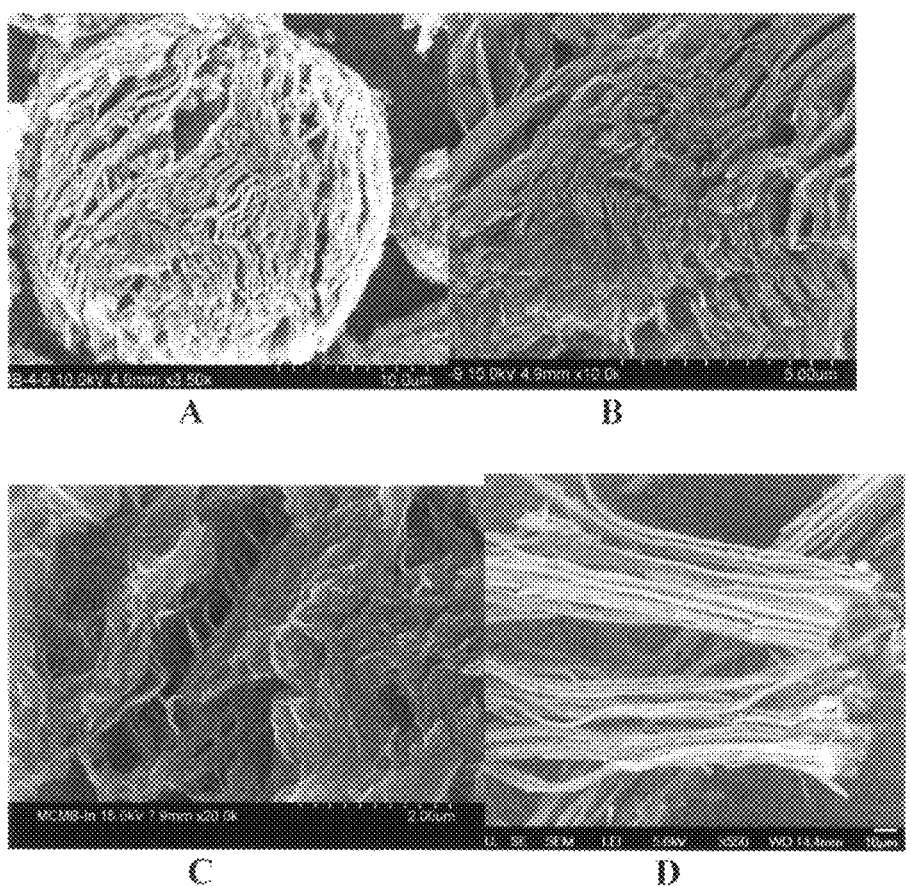
FIG. 1 (A) SEM image of a meso-porous graphitic structure prepared by expanding a soft carbon; (B) a meso-porous graphitic structure prepared by chemically etching or expanding a hard carbon material; (C) an expanded MCMB; and (D) expanded carbon fibers.
Figure 2:
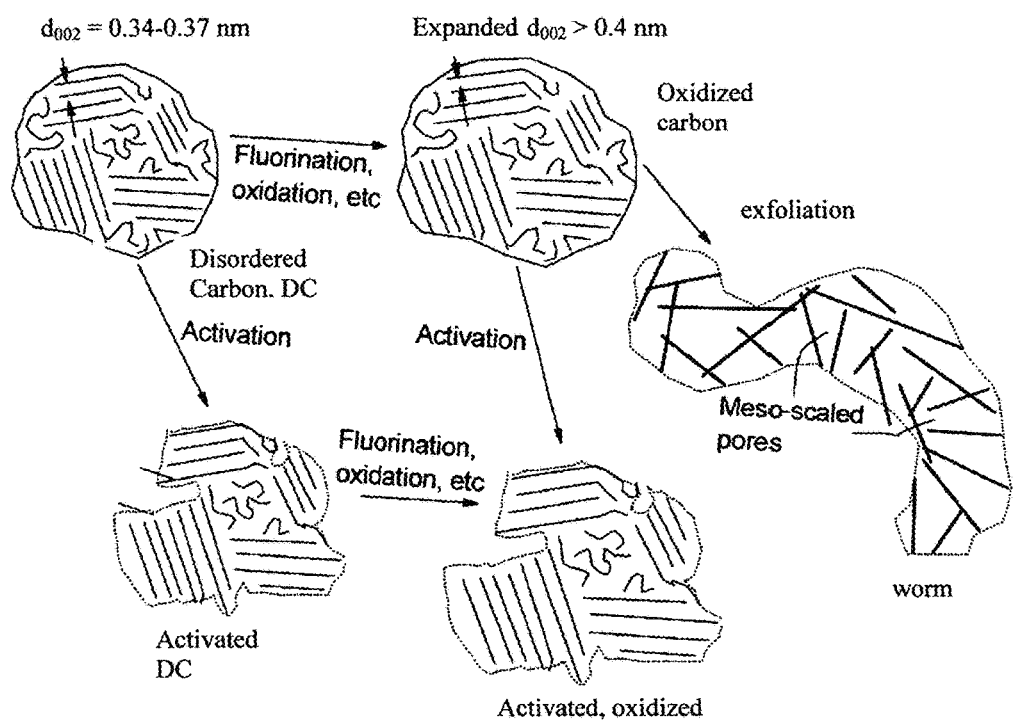
FIG. 2 Schematic of selected procedures for producing activated disordered carbon, oxidized or fluorinated carbon (with an expanded inter-graphene spacing), expanded carbon, and activated/expanded carbon from disordered carbon.
Figure 3:
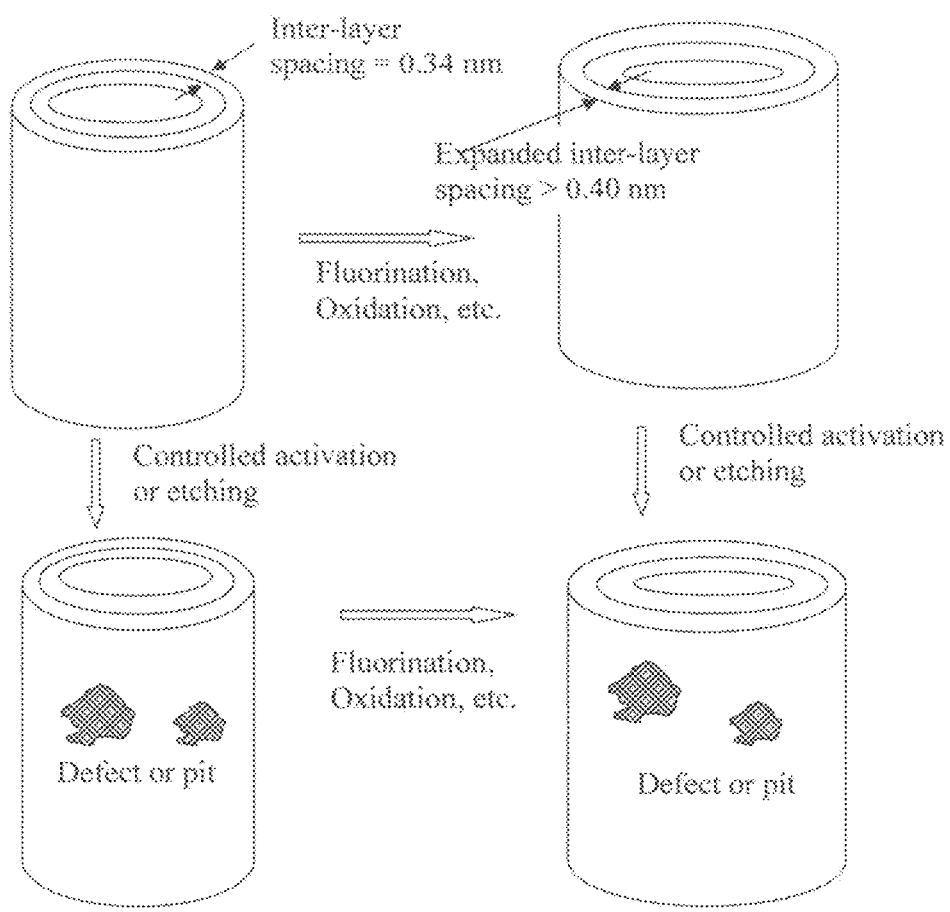
FIG. 3 Schematic of selected procedures for producing activated carbon nanotubes, oxidized or fluorinated CNTs with an expanded inter-graphene spacing, and activated/expanded CNTs from multi-walled CNTs.

For convenience, the following discussion of preferred embodiments is primarily based on cathodes for Li—S cells, but the same or similar methods are applicable to deposition of S in the cathode for the Na—S and K—S cells. Examples are presented for Li—S cells, room-temperature Na—S cells, and K—S cells.

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer and a method of producing such a cathode active layer, which is a pre-sulfurized active cathode layer. This method comprises the following four steps, (a)-(d):

a) Preparing an integral layer of meso-porous structure (a porous sheet, paper, web, film, fabric, non-woven, mat, aggregate, or foam) having meso pores, 2-50 nm in size) of a carbon, graphite, metal, or polymer material having massive surfaces to accommodate S thereon with a specific surface area greater than 100 $m^2/g$ (these surfaces must be accessible to electrolyte). The meso-porous structure has a specific surface area preferably >500 $m^2/g$ and more preferably >750 $m^2/g$, and most preferably >1,000 $m^2/g$.

b) Preparing an electrolyte comprising a solvent (preferably non-aqueous solvent, such as organic solvent and or ionic liquid) and at least a sulfur source dissolved or dispersed in the solvent;

c) Preparing an anode; and d) Bringing the integral layer of meso-porous structure and the anode in ionic contact with the electrolyte (e.g. by immersing all these components in a chamber that is external to the intended Li—S cell, or encasing these three components inside the Li—S cell) and imposing an electric current between the anode and the integral layer of meso-porous structure (serving as a cathode) with a sufficient current density for a sufficient period of time to electrochemically deposit nano-scaled sulfur particles or coating in the meso pores to form the pre-sulfurized active cathode layer.

The integral layer of a meso-porous structure is composed primarily of a carbon, graphite, metal, or conductive polymer selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nano-fiber, chemically activated carbon nano-tube, chemically treated carbon fiber, chemically activated graphite fiber, chemically activated carbonized polymer fiber, chemically treated coke, activated meso-phase carbon, meso-porous carbon, electro-spun conductive nano fiber, vapor-grown carbon or graphite nano fiber, carbon or graphite whisker, carbon nano-tube, carbon nanowire, metal nano wire, metal-coated nanowire or nano-fiber, conductive polymer-coated nanowire or nano-fiber, or a combination thereof. Particles and/or fibrils of this material, when packed into an integral electrode layer of meso-porous structure must still exhibit a specific surface area >100 $m^2/g$ that this in direct contact with the electrolyte. The meso-pores must be accessible to the electrolyte.

The layer of meso-porous structure can contain 0-49% (preferably 0-30%, more preferably 0-30%, and further preferably 0-10%) by weight of sulfur or sulfur-containing compound pre-loaded therein, based on the weights of all ingredients in the layer prior to the step (d) of depositing sulfur coating or particles in the meso-pores. Preferably, zero (0%) sulfur or sulfur-containing compound is pre-loaded into the porous graphene structure since this pre-loaded material, if not done properly, can negatively impact the subsequent pre-sulfurization step.

The S particles or coating have a thickness or diameter smaller than 20 nm (preferably <10 nm, more preferably <5 nm, and further preferably <3 nm) and wherein the nano-scaled sulfur particles or coating occupy a weight fraction of at least 70% (preferably >80%, more preferably >90%, and most preferably >95%) based on the total weights of the sulfur particles or coating and the meso-porous material combined. It is advantageous to deposit as much S as possible yet still maintain ultra-thin thickness or diameter of the S coating or particles (e.g. >80% and <3 nm; >90% and <5 nm; and >95% and <10 nm, etc.).

B. Production of Various Meso-Porous Structures

The following types of porous structures are found to be particularly suitable for use to support and protect the sulfur coating or particles: a porous sheet, paper, web, film, fabric, non-woven, mat, aggregate, or foam of a carbon or graphite material that has been expanded, activated, chemically treated, and/or expanded. This porous structure can contain chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nano-fiber, chemically activated or expanded carbon nano-tube, carbon fiber, graphite fiber, carbonized polymer fiber, coke, meso-phase carbon, or a combination thereof. The expanded spacing is preferably >0.5 nm, more preferably >0.6 nm, and most preferably >0.8 nm.

Alternatively, the meso-porous structure may contain a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nano-wire mat, surface-passivated porous metal, porous conductive polymer film, conductive polymer nano-fiber mat or paper, conductive polymer foam, carbon foam, carbon aerogel, carbon xerogel, or a combination thereof. These porous and electrically conductive materials are capable of accommodating sulfur in their pores and, in many cases, capable of protecting the sulfur coating or particles from getting dissolved in a liquid electrolyte, in addition to providing a 3-D network of electron-conducting paths. For the purpose of defining the claims, the instant cathode does not contain those isolated graphene sheets or platelets not supported on metal, carbon, ceramic, or polymer fibers or foams.

Conductive polymer nano-fiber mats can be readily produced by electro-spinning of a conductive polymer, which can be an intrinsically conductive (conjugate-chain) polymer or a conductive filler-filled polymer. Electro-spinning is well-known in the art. The production of carbon foam, carbon aerogel, or carbon xerogel is also well-known in the art.

Particularly useful metal foams include copper foam, stainless steel foam, nickel foam, titanium foam, and aluminum foam. The fabrication of metal foams is well known in the art and a wide variety of metal foams are commercially available. Preferably, the surfaces of metallic foams are coated with a thin layer of carbon or graphene because carbon and graphene are more electrochemically inert and will not get dissolved during the charge/discharge cycles of the cell. Hence, carbon-coated metal foam, graphene-coated metal foam, carbon-coated metal web or screen, graphene-coated metal web or screen, carbon-coated porous metal sheet, graphene-coated porous metal sheet, carbon-coated metal-fiber mat, graphene-coated metal-fiber mat, carbon-coated metal nanowire mat, and graphene-coated metal nano-wire mat are preferred current collector materials for use in the rechargeable lithium cell. Also particularly useful are carbon foam, carbon aerogel, and carbon xerogel. These foams may be reinforced with a binder resin, conductive polymer, or CNTs to make a porous structure of good structural integrity.

In one preferred embodiment, highly porous graphitic or carbonaceous materials may be used to make a conductive and protective backbone porous structure prior to impregnating the resulting porous structure with sulfur. In this approach, particles of these materials may be bonded by a binder to form a porous structure of good structural integrity.

In another possible route, porous graphitic or carbonaceous material particles, along with a resin binder, may be coated onto surfaces of a highly porous metal framework with large pores, such as a metal foam, web, or screen, which serves as a backbone for a meso-porous structure. The combined hybrid structure is preferably very porous with a specific surface area significantly greater than 100 $m^2/g$.

The carbonaceous or graphitic material may be selected from chemically treated graphite with an inter-graphene planar separation no less than 0.4 nm (preferably greater than 0.5 nm, more preferably greater than 0.6 nm) which is not exfoliated, soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon fiber or nano-fiber, or a combination thereof. These carbonaceous or graphitic materials have one thing in common; they all have meso-scaled pores, enabling entry of electrolyte to access their interior planes of hexagonal carbon atoms.

In one preferred embodiment, the meso-porous carbonaceous material may be produced by using the following recommended procedures:

(A) dispersing or immersing a graphitic or carbonaceous material (e.g., powder of meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a carbon intercalation compound (CIC), graphite fluoride (GF), or chemically etched/treated carbon material; and optionally (B) exposing the resulting CIC, GF, or chemically etched/treated carbon material to a thermal treatment, preferably in a temperature range of 150-600° C. for a short period of time (typically 15 to 60 seconds) to obtain expanded carbon.

Alternatively, after step (A) above, the resulting CIC, GF, or chemically etched/treated carbon material is subjected to repeated rinsing/washing to remove excess chemical. The rinsed products are then subjected to a drying procedure to remove water. The dried CIC, GF, chemically treated CB, chemically treated AC, chemically treated MWCNT, chemically treated CNF, chemically treated carbon/graphite/pitch fiber can be used as a cathode active material of the presently invented high-capacity cell. These chemically treated carbonaceous or graphitic materials can be further subjected to a heat treatment at a temperature preferably in the range of 150-600° C. for the purposes of creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by the electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Li-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

In general, the cathode active material (including the porous backbone structure and S lodged in the pores) as a whole also preferably form a meso-porous structure with a desired amount of meso-scaled pores (2-50 nm, preferably 2-10 nm) to allow the entry of electrolyte. This is advantageous because these pores enable a great amount of surface areas to be in physical contact with electrolyte and capable of capturing S precipitated from the electrolyte during the subsequent electrochemical deposition and capturing/releasing lithium (sodium or potassium) from/to the electrolyte during subsequent battery charges/discharges. These surface areas of the cathode active material as a whole are typically and preferably >100 m$^2$/g, more preferably >500 m$^2$/g, further more preferably >1,000 m$^2$/g, and most preferably >1,500 m$^2$/g.

C. Deposition of Sulfur on Massive Graphene Surfaces of the Porous Graphene Structure Once a layer of meso-porous structure (e.g. a porous sheet, paper, web, film, fabric, non-woven, mat, aggregate, or foam having meso pores, 2-50 nm in size) is prepared, this layer can be immersed in an electrolyte (preferably liquid electrolyte), which comprises a solvent and a sulfur source dissolved or dispersed in the solvent. This layer basically serves as a cathode in an external electrochemical deposition chamber or a cathode in an intended alkali metal-sulfur cell (encased inside the packaging or casing of a battery).

Subsequently, an anode layer is also immersed in the chamber, or encased inside a battery cell. Any conductive material can be used as an anode material, but preferably this layer contains some lithium (or sodium or potassium). In such an arrangement, the integral layer of meso-porous structure and the anode are in ionic contact with the electrolyte. An electric current is then supplied between the anode and the integral layer of meso-porous structure (serving as a cathode) with a sufficient current density for a sufficient period of time to electrochemically deposit nano-scaled sulfur particles or coating in the meso pores to form the pre-sulfurized active cathode layer. The required current density depends upon the desired speed of deposition and uniformity of the deposited material.

This current density can be readily adjusted to deposit S particles or coating that have a thickness or diameter smaller than 20 nm (preferably <10 nm, more preferably <5 nm, and further preferably <3 nm). The resulting nano-scaled sulfur particles or coating occupy a weight fraction of at least 70% (preferably >80%, more preferably >90%, and most preferably >95%) based on the total weights of the sulfur particles or coating and the graphene material combined.

In one preferred embodiment, the sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—S cell.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

For the purpose of internal electrochemical deposition of S inside meso pores of a cathode layer in a cell, the electrolyte may further comprise an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$), or a combination thereof.

In one preferred embodiment, as previously stated above, the electrochemical deposition is conducted before the cathode active layer is incorporated into an intended alkali metal-sulfur (e.g. Li—S) battery cell. In other words, the anode, the electrolyte, and the integral layer of porous graphene structure (serving as a cathode layer) are positioned in an external container outside of the intended battery cell. The needed apparatus is similar to an electroplating system. The step of electrochemically depositing nano-scaled sulfur particles or coating is conducted outside the battery cell and prior to the battery cell fabrication.

In another embodiment, the anode, the electrolyte, and the integral layer of meso-porous structure are disposed inside an alkali metal-sulfur cell. In other words, the battery cell itself is an electrochemical deposition system for pre-sulfurization of the cathode and the step of electrochemically depositing nano-scaled sulfur particles or coating occurs after the battery cell is fabricated. This electrochemical deposition procedure is conducted during the first charge cycle of the Li—S cell, Na—S cell, or K—S cell.

After an extensive and in-depth research effort, we have come to realize that such a pre-sulfurization surprisingly solves several most critical issues associated with current Li—S, Na—S, and K—S cells. For instance, this method enables the sulfur to be deposited in a thin coating or ultra-fine particle form, thus, providing ultra-short diffusion paths for Li/Na/K ions and, hence, ultra-fast reaction times for fast battery charges and discharges. This is achieved while maintaining a relatively high proportion of sulfur (the active material responsible for storing Li, Na, or K) and, thus, high specific Li/Na/K storage capacity of the resulting cathode active layer in terms of high specific capacity (mAh/g, based on the total weight of the cathode layer, including the masses of the active material, S, supporting graphene sheets, optional binder resin, and optional conductive filler).

It is of significance to note that one might be able to use a prior art procedure to deposit small S particles, but not a high S proportion, or to achieve a high proportion but only in large particles or thick film form. But, the prior art procedures have not been able to achieve both at the same time. It is highly advantageous to obtain a high sulfur loading and yet, concurrently, maintaining an ultra-thin/small thickness/diameter of sulfur for significantly enhanced energy density and power density. This has not been possible with any prior art sulfur loading techniques. For instance, we have been able to deposit nano-scaled sulfur particles or coating that occupy a >90% weight fraction of the cathode layer and yet maintaining a coating thickness or particle diameter <3 nm. This is quite a feat in the art of lithium-sulfur batteries. As another example, we have achieved a >95% S loading at an average S coating thickness of 4.8-7 nm.

Electrochemists or materials scientists in the art of Li—S batteries would expect that a greater amount of highly conducting carbon or graphite materials (hence, a smaller amount of S) in the cathode active layer should lead to a better utilization of S, particularly under high charge/discharge rate conditions. Contrary to these expectations, we have observed that the key to achieving a high S utilization efficiency is minimizing the S coating or particle size and is independent of the amount of S loaded into the cathode provided the S coating or particle thickness/diameter is small enough (e.g. <10 nm, or even better if <5 nm). The problem here is that it has not been previously possible to maintain a thin S coating or small particle size if S is higher than 50% by weight. Here we have further surprisingly observed that the key to enabling a high specific capacity at the cathode under high charge/discharge rate conditions is to maintain a high S loading and still keep the S coating or particle size as small as possible, and this is accomplished by using the presently invented pre-sulfurization method.

The electrons coming from or going out through the external load or circuit must go through the conductive additives (in a conventional sulfur cathode) or a conductive framework (e.g. conductive meso-porous structure as herein disclosed) to reach the cathode active material. Since the cathode active material (e.g. sulfur or lithium polysulfide) is a poor electronic conductor, the active material particle or coating must be as thin as possible to reduce the required electron travel distance.

Furthermore, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem. Most surprisingly, the implementation of a meso-porous structure as a conductive supporting material for sulfur or lithium polysulfide has made it possible to achieve an active material utilization rate of typically >>80%, more often greater than 90%, and, in many cases, close to 95%-99%.

Still another unexpected result of the instant method is the observation that thinner S coating leads to more stable charge/discharge cycling with significantly reduced shuttling effect that has been a long-standing impediment to full commercialization of Li—S batteries. We overcome this problem yet, at the same time, achieving a high specific capacity. In all prior art Li—S cells, a higher S loading leads to a faster capacity decay.

The shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It seems that the presence of massive carbon surfaces have been able to prevent or reduce such a dissolution and migration issue.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and LiN $(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to −300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkylpyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In one embodiment, the cathode layer may be pre-loaded with up to 30% (preferably <15% and more preferably <10%) of an active material (sulfur or lithium polysulfide) prior to the cathode layer fabrication. In yet another embodiment, the cathode layer can contain a conductive filler, such as carbon black (CB), acetylene black (AB), graphite particles, activated carbon, meso-porous carbon, meso-carbon micro bead (MCMB), carbon nano-tube (CNT), carbon nano-fiber (CNF), carbon fiber, or a combination thereof. These materials (not meso-porous) are for use as a conductive filler, not as a support for S.

The anode active material may contain, as an example, lithium metal foil or a high-capacity Si, Sn, or $SnO_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, $SnO_2$, etc.).

At the anode side, when lithium metal is used as the sole anode active material in a Li—S cell, there is concern about the formation of lithium dendrites, which could lead to internal shorting and thermal runaway. Herein, we have used two approaches, separately or in combination, to addressing this dendrite formation issue: one involving the use of a high-concentration electrolyte at the anode side and the other the use of a nano-structure composed of conductive nano-filaments. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-sulfur with a conventional anode configuration: The cell contains an optional cathode current collector, a presently invented cathode layer, a separator/electrolyte, and an anode current collector. Potential dendrite formation may be overcome by using the high-concentration electrolyte at the anode.

(B) Lithium metal-sulfur cell with a nano-structured anode configuration: The cell contains an optional cathode current collector, a cathode herein invented, a separator/electrolyte, an optional anode current collector, and a nano-structure to accommodate lithium metal that is deposited back to the anode during a charge or re-charge operation. This nano-structure (web, mat, or paper) of nano-filaments provide a uniform electric field enabling uniform Li metal deposition, reducing the propensity to form dendrites. This configuration can provide a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-sulfur cell with a nano-structured anode: For instance, the cell contains a web of nano-fibers coated with Si coating or bonded with Si nano particles. The cell also contains an optional cathode current collector, a cathode herein invented, a separator/electrolyte, and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector. This cathode current collector is optional because the presently invented layer of porous graphene structure, if properly designed, can act as a current collector or as an extension of a current collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Meso-Porous Soft Carbon as a Supporting and Protective Backbone for Sulfur Chemically etched or expanded soft carbon was prepared from heat-treating a liquid crystalline aromatic resin (50/50 mixture of anthracene and pyrene) at 200° C. for 1 hour. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. This material can be used in both the anode and cathode due to its high specific surface area and its ability to capture and store lithium atoms on its surfaces. These surfaces (inside pores) were also found to be particularly suitable for supporting sulfur nano coating or nano particles.

Example 2: Expanded "Activated Carbon" (E-Ac) as a Supporting and Protective Porous Backbone for Sulfur Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC. This material can be used in both the anode and cathode of a lithium cell due to its high specific surface area and ability to capture and store Li atoms on its surfaces. These surfaces were also found to be particularly suitable for supporting nano sulfur in meso-pores.

Example 3: Chemically Treated (Expanded) Needle Coke as a Supporting and Protective Porous Backbone for Sulfur Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours. The treated coke is highly porous, having a pore size range of approximately 1-85 nm.

Example 4: Chemically Treated (Expanded) Petroleum Pitch-Derived Hard Carbon as a Supporting and Protective Porous Backbone A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles. The hard carbon-based porous structure was found to have a pore size range of 3-100 nm (mostly <50 nm) and to be particularly suitable for supporting and protecting pores lodged therein.

Example 5: Chemically Activated Meso-Phase Carbon and Production of Fluorinated Carbon as a Supporting and Protective Porous Backbone Meso-carbon carbon particles (un-graphitized MCMBs) were supplied from China Steel Chemical Co. This material has a density of about 2.2 g/cm$^3$ with a median particle size of about 16 µm. This batch of meso-phase carbon was divided into two samples. One sample was immersed in $K_2CO_3$ at 900° C. for 1 h to form chemically activated meso-carbon. The chemically activated meso-phase carbons showed a BET specific surface area of 1,420 m$^2$/g. This material can be used in both the anode and cathode due to its high specific surface area and ability to capture and store metal atoms on its surfaces. These surfaces were found to be particularly suitable for supporting and protecting sulfur nano coating or particles.

The other sample was subjected to a fluorination treatment. The meso-phase carbon particles were mixed with a PVDF binder in a NMP solution and coated onto an Al foil to form an electrode sheet. This electrode sheet was used as a working electrode in an electrochemical fluorination treatment apparatus consisting of a PTFE beaker, a Pt plate counter electrode, a Pd wire as a reference electrode, and $(C_2H_5)_3$N-3HF as electrolyte. The fluorination procedure was carried out at room temperature by potential sweeping from −1.0 V to 1.0 V at a 20 mV/s scan rate. X-ray diffraction data indicate that the inter-graphene spacing has been increased from 0.337 nm to 0.723 nm.

Example 6: Graphitic Fibrils from Pitch-Based Carbon Fibers for Forming a Porous Backbone Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured. Graphitic fibrils, alone or in combination with another particulate carbon/graphite material, can be packed into a meso-porous structure for supporting sulfur.

Example 7: Expanded Multi-Walled Carbon Nanotubes (MWCNTs) as a Supporting and Protective Porous Backbone Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. Expanded MWCNTs, alone or in combination with another particulate carbon/graphite material, can be packed into a meso-porous structure for supporting sulfur.

Example 8: Conductive Web of Filaments from Electro-Spun PAA Fibrils as a Supporting Layer for Both an Anode and a Cathode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nano-fibers with an average fibril diameter of 67 nm. Such a web can be used as a conductive substrate for an anode active material. We observe that the implementation of a network of conductive nano-filaments at the anode of a Li—S cell can effectively suppress the initiation and growth of lithium dendrites that otherwise could lead to internal shorting. Carbonized version of PI nano-fibers can be formed into a meso-porous mat for supporting sulfur in the cathode.

Example 9: Electrochemical Deposition of S on Various Meso-Porous Webs or Paper Structures Prepared in Previous Examples (External Electrochemical Deposition) for Li—S, Na—S, and K—S Batteries The electrochemical deposition may be conducted before the cathode active layer is incorporated into an alkali metal-sulfur battery cell (Li—S, Na—S, or K—S cell). In this approach, the anode, the electrolyte, and the integral layer of meso-porous structure (serving as a cathode layer) are positioned in an external container outside of a lithium-sulfur cell. The needed apparatus is similar to an electroplating system, which is well-known in the art.

In a typical procedure, a metal polysulfide ($M_xS_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution is then poured into a chamber or reactor under a dry and controlled atmosphere condition (e.g. He or Nitrogen gas). A metal foil can be used as the anode and a layer of the porous graphene structure as the cathode; both being immersed in the electrolyte solution. This configuration constitutes an electrochemical deposition system. The step of electrochemically depositing nano-scaled sulfur particles or coating on the graphene surfaces is conducted at a current density preferably in the range of 1 mA/g to 10 A/g, based on the layer weight of the porous graphene structure.

The chemical reactions that occur in this reactor may be represented by the following equation: $M_xS_y \rightarrow M_xS_{y-z}+zS$ (typically z=1-4). Quite surprisingly, the precipitated S is preferentially nucleated and grown on massive graphene surfaces to form nano-scaled coating or nano particles. The coating thickness or particle diameter and the amount of S coating/particles may be controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited.

Comparative Example 9A: Chemical Reaction-Induced Deposition of Sulfur Particles on Chemically Treated or Un-Treated CNTs Prior to Preparation of a Cathode Layer A prior art chemical deposition method is herein utilized to prepare S-CNT composites. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a CNT-sulfur composite was prepared by a chemical deposition method in an aqueous solution. First, 180 mg of CNTs was suspended in 180 ml ultrapure water with a surfactant and then sonicated at 50° C. for 5 hours to form a stable CNT dispersion. Subsequently, the $Na_2S_x$ solution was added to the above-prepared GO dispersions in the presence of 5 wt % surfactant cetyl trimethyl-ammonium bromide (CTAB), the as-prepared CNT/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+ \rightarrow (x-1) S+H_2S$.

Comparative Example 9B: Redox Chemical Reaction-Induced Deposition of Sulfur Particles in CNTs and Activated Carbon Mats (Chemically Treated or Un-Treated)

In this chemical reaction-based deposition process, sodium thiosulfate ($Na_2S_2O_3$) was used as a sulfur source and HCl as a reactant. A CNT-water or AC-water suspension was prepared and then the two reactants (HCl and $Na_2S_2O_3$) were poured into this suspension. The reaction was allowed to proceed at 25-75° C. for 1-3 hours, leading to the precipitation of S particles deposited in or on CNTs or ACs. The reaction may be represented by the following reaction:

$$2HCl+Na_2S_2O_3 \rightarrow 2NaCl+S\downarrow+SO_2\uparrow+H_2O.$$

Comparative Example 9C: Preparation of S/Mc and S/Cb Nanocomposites Via Solution Deposition Meso-porous carbon, chemically treated or untested, (and, separately, carbon black particles) and S were mixed and dispersed in a solvent ($CS_2$) to form a suspension. After thorough stirring, the solvent was evaporated to yield a solid nanocomposite, which was then ground to yield nanocomposite powder. The primary sulfur particles in these nanocomposite particles have an average diameter of approximately 10-30 nm.

Example 10: Electrochemical Deposition of S on Various Webs or Paper-Based Cathode Structures in Li—S, Na—S, or K—S Batteries (Internal Electrochemical Deposition)

As an alternative to the external electrochemical deposition, an internal electrochemical conversion and deposition of S from an electrolyte-borne sulfur source in meso-pores was also conducted using a broad array of meso-porous structures. As a typical procedure, the anode, the electrolyte, and the integral layer of meso-porous structure are packaged inside a housing to form an alkali metal-sulfur cell. In such a configuration, the battery cell itself is an electrochemical deposition system for pre-sulfurization of the cathode and the step of electrochemically depositing nano-scaled sulfur particles or coating occurs after the battery cell is fabricated and conducted during the first charge cycle of the cell.

As a series of examples, lithium polysulfide ($Li_xS_y$)— and sodium polysulfide ($Na_xS_y$)-containing electrolytes with desired x and y values (e.g. x=2, and y=6-10) dissolved in solvent were prepared by chemically reacting stoichiometric amounts of sulfur and $Li_2S$ or $Na_2S$ in polysulfide free electrolyte of 0.5 M LiTFSI+0.2 M $LiNO_3$ (or 0.5 M NaTFSI+0.2 M $NaNO_3$) in DOL/DME (1:1, v:v). The electrolyte was stirred at 75° C. for 3-7 hours and then at room temperature for 48 hours. The resulting electrolytes contain different $Li_xS_y$ or $Na_xS_y$ species (e.g. x=2, and y=6-10, depending upon reaction times and temperatures), which are intended for use as a sulfur source in a battery cell.

In a Li—S or Na—S cell, one of these electrolytes was selected to combine with an anode current collector (Cu foil), an anode layer (e.g. Li metal foil or Na particles), a porous separator, a layer of porous graphene structure, and a cathode current collector (Al foil) to form a Li—S or room temperature Na—S cell. The cell was then subjected to a first charge procedure using a current density ranging from 5 mA/g to 50 A/g. The best current density range was found to be from 50 mA/g to 5 A/g.

Examples of the metal polysulfide ($M_xS_y$) materials, solvents, meso-porous materials used in the present study are presented in Table 1 below, wherein the following abbreviations are used: chemically etched or expanded soft carbon (CSC), chemically etched or expanded hard carbon (CHC), exfoliated activated carbon (EAC), chemically etched or expanded carbon black (CCB), chemically etched multi-walled carbon nanotube (C-CNT), nitrogen-doped carbon nanotube (N-CNT), boron-doped carbon nanotube (B-CNT), chemically doped carbon nanotube (D-CNT), ion-implanted carbon nanotube (I-CNT), chemically treated carbon fiber (CCF), chemically activated graphite fiber (CGF), chemically activated carbonized polymer fiber (CC-PF), chemically treated coke (C-coke), activated meso-phase carbon (A-MC), meso-porous carbon (MC), electro-spun conductive nano fiber (ES-NF), vapor-grown carbon or graphite nano fiber (VG-CNF or VG-GNF), metal nano wire (M-NW), metal-coated nanowire or nano-fiber (MC-NW), conductive polymer-coated nanowire or nano-fiber (CP-NW or CP-NF).

TABLE 1

Selected examples of the metal polysulfide materials, solvents, graphene materials, and exfoliated graphite materials used in the present study.

| Sulfur source (e.g. $M_xS_y$) | Solvent | Li/Na/K salts | Type of porous graphene structure in the cathode |
|---|---|---|---|
| $Li_2S_6$ | DOL/DME | LiTFSI | CSC, CHC, EAC, CCB |
| $Li_2S_9$ | DOL/DME | LiTFSI | CSC, CHC, EAC, CCB |
| $Na_2S_5$ | Tetra ethylene glycol dimethyl ether (TEGDME) | NaTFSI | C-CNT, N-CNT, B-CNT, D-CNT, I-CNT |
| $Na_2S_6$ | TEGDME | NaTFSI | C-CNT, CCF, CGF, CC-PF |
| $K_2S_6$ | TEGDME | KTFSI | C-coke, A-MC, MC, ES-NF, VG-CNF, VG-GNF |
| $MgS_6$ | Diglyme/tetraglyme | $[Mg_2Cl_3][HMDSAlCl_3]$ (HMDS = hexamethyldisilazide) | M-NW, MC-NW, CP-NW, CP-NF |
| $MgS_4$ | Diglyme/tetraglyme | $[Mg_2Cl_3][HMDSAlCl_3]$ (HMDS = hexamethyldisilazide) | CSC, CHC, EAC, CCB |
| $CuS_2$ | $NH_4OH$ or HCl or $H_2SO_4$ | $CuCl_2$ | C-CNT, N-CNT, B-CNT, D-CNT, I-CNT |
| $Cu_8S_5$ | $NH_4OH$ or HCl or $H_2SO_4$ | $CuCl_2$ | CSC, CHC, EAC, CCB |
| ZnS | $H_2SO_4$ solution | $ZnSO_4$ | CSC, CHC, EAC, CCB |
| $Al_2S_3$ | $H_2SO_4$ | $Al_2(SO_4)_3$ | C-CNT, CCF, CGF, CC-PF |
| $SnS_2$ | $HNO_3$ and HCl | $SnCl_2$ | C-coke, A-MC, MC, ES-NF, VG-CNF, VG-GNF |
| SnS | HCl | $SnCl_2$ | C-coke, A-MC, MC, ES-NF, VG-CNF, VG-GNF |

There are several prior art methods that could be used to incorporate sulfur (the cathode active material) in the cathode layer; e.g. direct mixing of S powder with carbon black particles, physical vapor deposition of S in a carbon paper (e.g. carbon nano-fiber, CNF), direct mixing lithium polysulfide particles with a conductive filler (e.g. carbon nanotubes), etc. For comparison purposes, we have chosen 3 methods, briefly described in Comparative Examples 10A-10C:

Comparative Examples 10A

One way to incorporate sulfur or lithium polysulfide particles in a pre-fabricated web of conductive CNF sheets is to use a dip-coating process. In a typical procedure, a CNF-based web was immersed (dipped) in a suspension containing lithium polysulfide particles dispersed in a fluid; e.g. a low molecular weight polyethylene oxide (PEO) that could later become part of a polymer gel phase. This PEO had a melting point lower than 60° C., which gave a relatively low-viscosity fluid at 90° C. The lithium polysulfide particle concentrations (typically 5% to 40% by volume) and the immersion time (typically 1-10 seconds) were adjusted to achieve a desired amount of lithium polysulfide particles embedded in the interstitial spaces (pores) between individual CNFs.

Comparative Examples 10B: Preparation of Sulfur-Coated Webs for Cathodes

The step involves deposition of elemental sulfur on meso-porous structures through, for instance, a sublimation-based physical vapor deposition. Sublimation of solid sulfur occurs at a temperature greater than 20° C., but a significant sublimation rate typically does not occur until the temperature is above 40° C. In a typical procedure, a meso-porous structure or nano-filament web is sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, most preferred lower than 10 nm or even 5 nm.

Several series of Li metal and Li-ion cells were prepared using the presently prepared cathode. The first series is a Li metal cell containing a copper foil as an anode current collector and the second series is also a Li metal cell having a nano-structured anode of conductive filaments (based on electro-spun carbon fibers) plus a copper foil current collector. The third series is a Li-ion cell having a nano-structured anode of conductive filaments (based on electro-spun carbon fibers coated with a thin layer of Si using CVD) plus a copper foil current collector. The fourth series is a Li-ion cell having a graphite-based anode active material as an example of the more conventional anode.

Comparative Examples 10C: Mixing of Sulfur with Soft Carbon or Carbon Black Particles Via Ball-Milling Sulfur particles and soft carbon (0% to 49% by weight of S in the resulting composite) were physically blended and then subjected to ball milling for 2-24 hours to obtain S-SC composite particles (typically in a ball or potato shape). For comparison, untreated or chemically treated SC particles only (without S) were also ball-milled to obtain ball- or potato-shaped graphene particles. The particles, containing various S contents, were then made into a layer of porous structure intended for use in the cathode. Another series of samples for comparison were made under similar processing conditions, but with carbon black particles replacing SC particles.

Example 11: Some Examples of Electrolytes Used

A wide range of lithium salts can be dissolved in a wide array of solvents, individually or in a mixture form. The following are good choices for lithium salts that are dissolved well to a high concentration in selected solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). These selected solvents are DME/DOL mixture, TEGDME/DOL, PEGDME/DOL, and TEGDME. A good electrolyte additive for helping to stabilize Li metal is $LiNO_3$. Useful sodium salts and potassium salts include sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Good solvents are DME/DOL mixture, TEGDME/DOL, PEGDME/DOL, and TEGDME.

Room temperature ionic liquids (RTILs) are of great interest due to their low volatility and non-flammability. Particularly useful ionic liquid-based electrolyte systems include: lithium bis(trifluoro methanesulfonyl)imide in a N-n-butyl-N-ethylpyrrolidinium bis(trifluoromethane sulfonyl)imide (LiTFSI in BEPyTFSI), N-methyl-N-propylpiperidinium bis(trifluoromethyl sulfonyl)imide ($PP_{13}TFSI$) containing LiTFSI, N,N-diethyl-N-methyl-N-(2-methoxyethyl) ammonium bis(trifluoromethylsulfonyl)imide (DEMETFSI) containing LiTFSI.

Example 12: Evaluation of Electrochemical Performance of Various Li—S, Na—S, and K—S Cells Charge storage capacities were measured periodically and recorded as a function of the number of cycles. The specific discharge capacity herein referred to is the total charge inserted into the composite cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Sulfur utilization efficiency data from many samples investigated are summarized in Table 2 below:

TABLE 2

Sulfur utilization efficiency data for alkali metal-sulfur cell cathodes containing various S contents, S coating thicknesses or particle diameters, substrate materials, and S deposition methods.

| Sample ID | Cathode active layer material | % of S and thickness or diameter (nm) | Cathode discharge capacity (mAh/g) | Discharge capacity, mAh/g, based on S weight | S utilization efficiency |
|---|---|---|---|---|---|
| CSC-1 | CSC | 95% S; 6.5 nm | 1410 | 1484 | 88.61% |
| CSC-2 | CSC | 95% S; 3.5 nm | 1492 | 1571 | 93.76% |
| CSC-3 | CSC | 75% S; 7.8 nm | 1105 | 1473 | 87.96% |
| CSC-c1 | CSC | 75% S (PVD) | 680 | 907 | 54.13% |
| CSC-c2 | CSC | 75% S + CSC; ball-milled | 690 | 920 | 54.93% |
| CSC-c3 | SC, non-treated | 75% S; external | 750 | 1000 | 59.70% |
| CHC-1 | CHC | 70% S, External | 1095 | 1564 | 93.39% |
| CHC-c1 | CHC | 70% S, Chemical reaction | 932 | 1331 | 79.49% |
| EAC-1 | EAC | 70% S, External | 1084 | 1549 | 92.45% |
| EAC-c1 | EAC | 70% S, solution | 925 | 1321 | 78.89% |
| C-CNT1 | C-CNT | 70% S, External | 1010 | 1443 | 86.14% |
| C-CNT2 | C-CNT | 70% S, in a cell | 1025 | 1464 | 87.42% |
| C-CNT-c1 | C-CNT | 70% S; PVD | 635 | 907 | 54.16% |
| C-CNT-c2 | C-CNT | 70% S; solution deposition | 680 | 971 | 58.00% |
| C-CNT-c3 | CNT, non-treated | 70% S; External | 825 | 1179 | 70.36% |
| A-MC1 | A-MC | 85% S; 9.2 nm, in a cell | 1254 | 1475 | 88.08% |
| A-MC-2 | A-MC | 85% S; 19.2 nm, external | 1202 | 1414 | 84.42% |
| A-MC-c1 | A-MC | 85% S; Chemical reaction | 1001 | 1178 | 70.31% |
| A-MC-c2 | MC, non-treated | 85% S: external | 1052 | 1238 | 73.89% |
| C-coke1 | C-coke | 85% S; external | 1210 | 1424 | 84.99% |
| C-coke2 | C-coke | 85% S; solution | 835 | 982 | 58.65% |
| ES-NF1 | ES-NF | 65% S; 19.2 nm, in a cell | 932 | 1434 | 85.60% |

TABLE 2-continued

Sulfur utilization efficiency data for alkali metal-sulfur cell cathodes containing various S contents, S coating thicknesses or particle diameters, substrate materials, and S deposition methods.

| Sample ID | Cathode active layer material | % of S and thickness or diameter (nm) | Cathode discharge capacity (mAh/g) | Discharge capacity, mAh/g, based on S weight | S utilization efficiency |
|---|---|---|---|---|---|
| ES-NFc1 | ES-NF | 65% S; solution | 665 | 1023 | 61.08% |
| M-NW1 | Ag NW | 92% S; Internal | 1355 | 1473 | 87.93% |
| M-NW | Ag NW | 92% S; in a cell | 1388 | 1509 | 90.07% |

The following observations can be made from the data of Table 2:

1) Thinner coatings prepared according to the instant invention lead to higher efficiency of S utilization given comparable S proportion. Given comparable S coating thickness, the S utilization efficiency is relatively independent of the S proportion deposited in meso pores.
2) For all the cathode substrate materials investigated, the presently invented electrochemical deposition method is significantly more effective than all conventional methods (PVD deposition, ball-milling, chemical reaction-based deposition, solution-based deposition, etc.) in terms of imparting S utilization efficiency to the resulting cathode structure of a Li—S, Na—S, or K—S cell.
3) Chemically treated or activated carbon materials are more effective than their non-treated counterparts.
4) Both external electrochemical deposition and internal electrochemical deposition are capable of depositing a high S proportion while maintaining a thin S coating (hence, high S utilization efficiency). Prior art methods are not capable of achieving both.
5) In general, in situ electrochemical deposition inside a battery cell is more effective than external electrochemical deposition.

Figure 4:
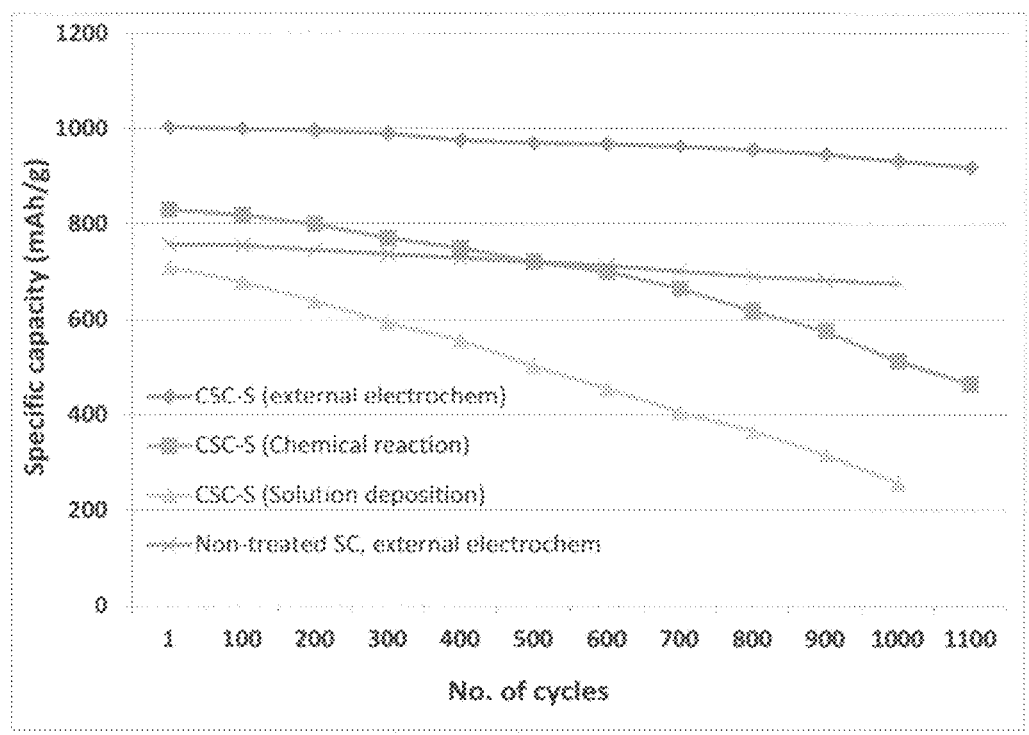
FIG. 4 The specific capacities (vs. number of charge/discharge cycles) for four Li—S cells: one featuring a chemically treated soft carbon (C-SC)-based cathode containing electrochemically deposited sulfur coating of the present invention, one containing chemically deposited sulfur in C-SC, one containing solution-deposited sulfur on C-SC, and one on electrochemical deposition of S in non-treated SC.

Shown in FIG. 4 are the specific capacities (vs. number of charge/discharge cycles) for four Li—S cells: one featuring a chemically treated soft carbon (C-SC)-based cathode containing electrochemically deposited sulfur coating of the present invention, one containing chemically deposited sulfur in C-SC, one containing solution-deposited sulfur on C-SC, and one on electrochemical deposition of S in non-treated SC. These data indicate that the presently invented Li—S cell does not exhibit any significant decay (only 8.4%) even after 1,100 cycles. In contrast, the prior art cell containing chemically deposited S coating-based cathode suffers a 44% capacity decay after 1,100 cycles. In fact, it suffers a 20% capacity decay after 650 cycles. The cycle life of a lithium battery cell is usually defined as the number of cycles when the cell reaches a 20% capacity decay. With this definition, the prior art Li—S cell featuring a solution-deposited S cathode shows a cycle life of 350 cycles, and suffers a 63.8% capacity decay after 1,000 cycles. These results are quite unexpected considering that the same type of chemically treated SC was used as the supporting material and the same amount of sulfur was deposited in these three cell cathodes.

The Li—S cell featuring a non-treated SC-based cathode containing electrochemically deposited sulfur shows a relatively stable capacity, albeit at a lower specific capacity. This lower specific capacity might be due to a lesser amount of meso-scaled pores capable of accommodating and retaining deposited sulfur. The cycling stability might be due to the effectiveness of the presently invented electrochemical deposition to uniformly deposit ultra-thin sulfur coating in the meso-pores in these disordered carbon materials and to retain the outstanding ability of the pore walls to retain thin sulfur coating, preventing dissolution of sulfur and polysulfide during battery operations.

Figure 5:
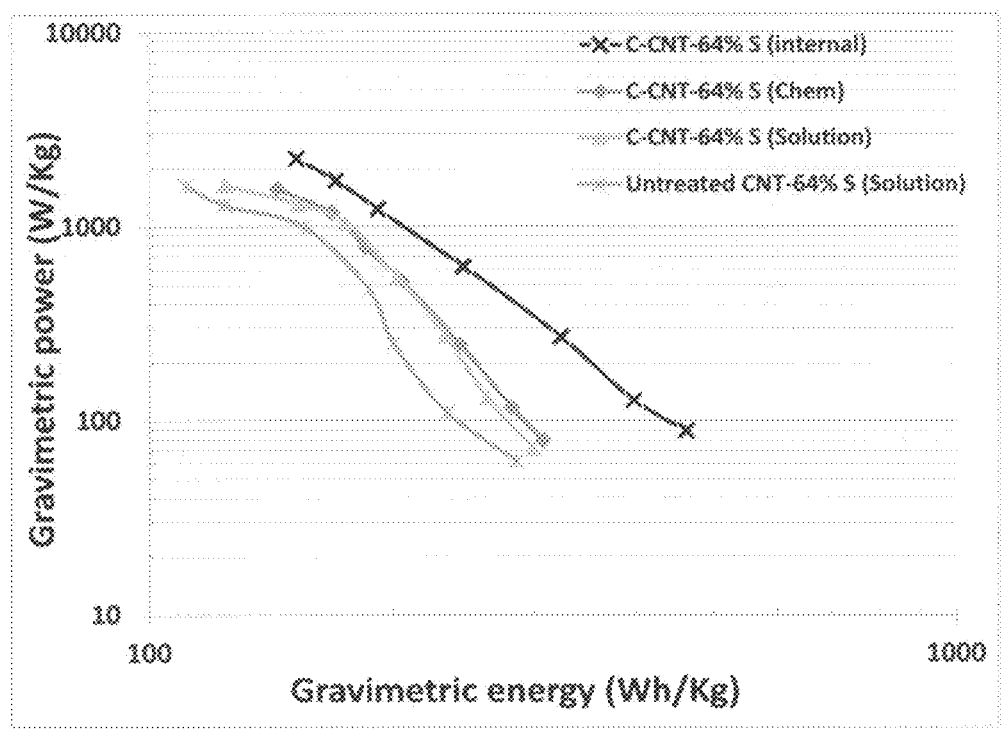
FIG. 5 Ragone plots (cell power density vs. cell energy density) of four Li metal-sulfur cells: C-CNT-based cathode containing electrochemically deposited sulfur particles (64% S), C-CNT-based cathode containing chemically deposited sulfur particles (64% S), C-CNT-based cathode containing solution-deposited sulfur particles (64% S), and untreated CNT-based cathode containing solution-deposited sulfur particles (64% S).

FIG. 5 shows Ragone plots (cell power density vs. cell energy density) of four Li metal-sulfur cells. The presently invented Li—S cell featuring a chemically treated/expanded CNT (C-CNT)-based cathode containing electrochemically deposited sulfur particles (64% by weight of S) exhibits an exceptional cell energy density (as high as 463 Wh/kg, based on total cell weight). With a sulfur proportion as low as 64% in the cathode, this exceptionally high energy density has not been previously achieved by any prior art Li—S cell. The same cell also delivers a maximum power density as high as 2231 W/kg, which is significantly higher than typical power densities (up to 500 W/kg) of lithium-ion batteries.

In contrast, the C-CNT-based cathode containing chemically deposited sulfur particles (64% S) enables the Li—S cell to store up to 308 Wh/kg and delivers a maximum power density of 1,558 W/kg. These are significantly lower than those of the presently invented cell. The cell featuring a C-CNT-based cathode containing solution-deposited sulfur particles (64% S) exhibits a maximum energy density of 285 Wh/kg and maximum power density of 1,268 W/kg. The un-treated CNT-based cathode containing solution-deposited sulfur particles (64% S) delivers a maximum cell energy density of 285 Wh/kg and maximum power density of 1,628 W/kg. These data have clearly demonstrated the unexpected yet superior effectiveness of the presently invented external and internal electrochemical deposition methods and the chemical treatment or expansion approach.

Figure 6:
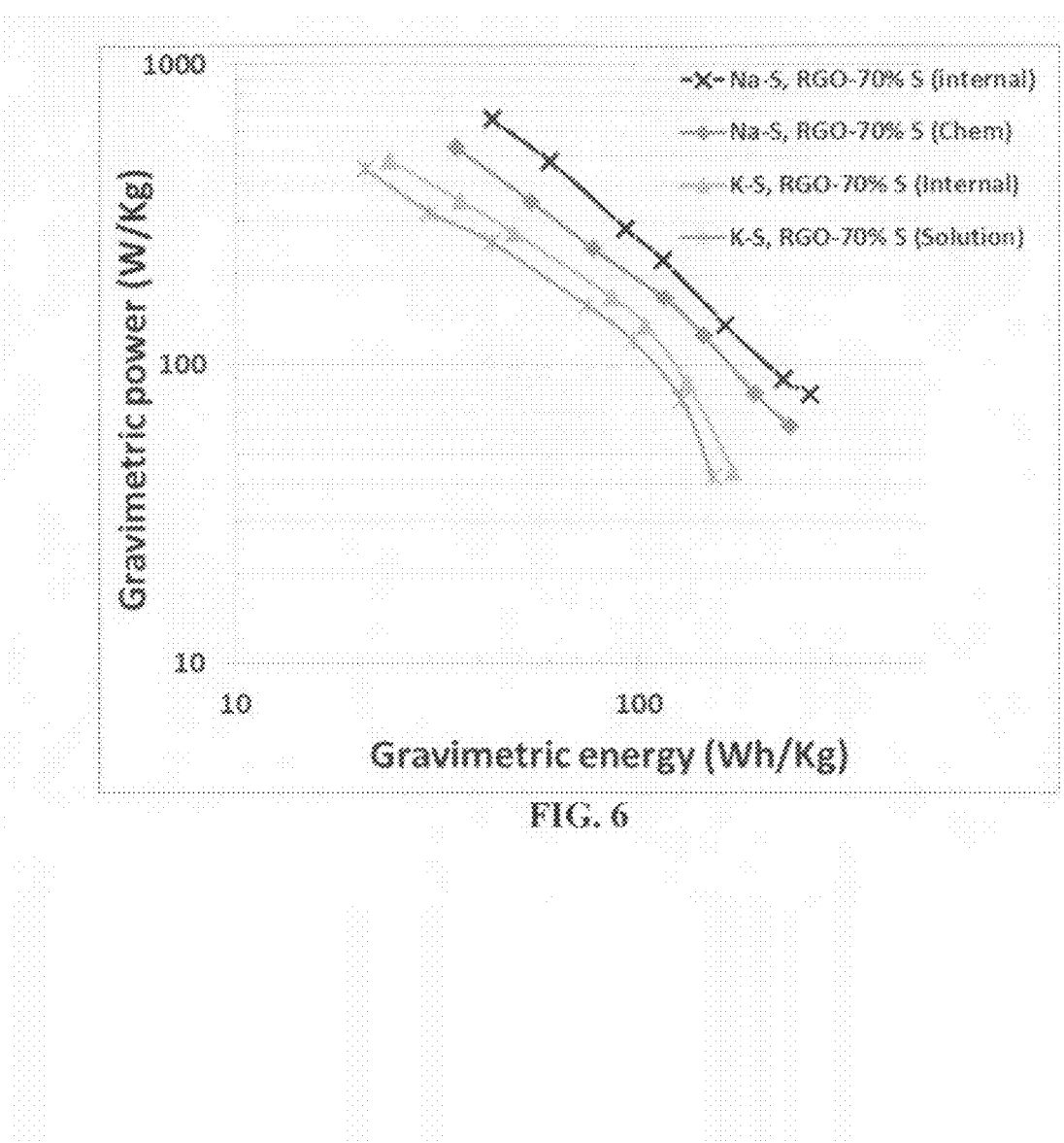
FIG. 6 Ragone plots (cell power density vs. cell energy density) of 4 alkali metal-sulfur cells: Na—S cell featuring a chemically treated meso-carbon (C-MC)-based cathode containing electrochemically deposited sulfur particles (70% S), Na—S cell featuring a C-MC-based cathode containing chemically deposited sulfur particles (70% S), K—S cell featuring a C-MC-based cathode containing electrochemically deposited sulfur particles (70% S), and K—S cell featuring a C-MC-based cathode containing solution-deposited sulfur particles (70% S).

Shown in FIG. 6 are Ragone plots (cell power density vs. cell energy density) for 4 alkali metal-sulfur cells. The first cell is a Na—S cell featuring a chemically treated meso-carbon (C-MC)-based cathode containing electrochemically deposited sulfur particles (70% S), which exhibits the highest energy density and power density among the four cells. The second is a Na—S cell featuring a C-MC-based cathode containing chemically deposited sulfur particles (70% S). Clearly, the cathode having chemically deposited S is not as effective as the presently invented cathode of electrochemically deposited S in providing high energy density and power density. The third cell is a K—S cell featuring a C-CMC-based cathode containing electrochemically deposited sulfur particles (70% S), and the fourth cell is a K—S cell featuring a C-CMC-based cathode containing solution-deposited sulfur particles (70% S). Again, the presently invented electrochemical method is so much superior. The data in FIG. 6 also indicate that the presently invented Na—S cells can store an energy density up to 268 Wh/kg, which is significantly higher than those of Li-ion batteries.

Additionally, even K—S cells can store up to 172 Wh/kg, better than most of the Li-ion cells. These highly surprising results are a good testament to the effectiveness of the presently invented method of depositing sulfur on graphene surfaces.

In summary, the present invention provides an innovative, versatile, and surprisingly effective platform materials technology that enables the design and manufacture of superior alkali metal-sulfur rechargeable batteries. The alkali metal-sulfur cell featuring a cathode containing a conductive, meso-porous structure with ultra-thin sulfur electrochemically deposited thereon exhibits a high cathode active material utilization rate, high specific capacity, high specific energy, high power density, little or no shuttling effect, and long cycle life. When a similarly configured anode structure (with no sulfur) or a nano-structured carbon filament web is implemented at the anode to support a lithium film (e.g. foil), the lithium dendrite issue is also suppressed or eliminated.

The invention claimed is:

1. An electrochemical method of producing a pre-sulfurized active cathode layer for a rechargeable alkali metal-sulfur cell, said method comprising:
  (a) preparing an integral layer of a meso-porous structure of a carbon, graphite, metal, or conductive polymer, wherein said meso-porous structure comprises meso-scaled pores of 2-50 nm and a specific surface area greater than 100 m$^2$/g and wherein said carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nanofiber, chemically activated carbon nanotube, chemically activated graphite fiber, chemically activated carbonized polymer fiber, chemically treated coke, activated meso-phase carbon, meso-porous carbon, electro-spun conductive nanofiber, highly separated vapor-grown carbon or graphite nanofiber, highly separated carbon nanotube, carbon nanowire, metal nanowire, metal-coated nanowire or nanofiber, conductive polymer-coated nanowire or nanofiber, or a combination thereof, and wherein said meso-porous structure comprises 0-49% by weight of sulfur or sulfur-containing compound pre-loaded therein and an optional binder material of 0-10% by weight;
  (b) preparing an electrolyte comprising a non-aqueous solvent and a sulfur source dissolved or dispersed in said solvent;
  (c) preparing an anode;
  (d) bringing said integral layer of meso-porous structure and said anode in ionic contact with said electrolyte and imposing an electric current between said anode and said integral layer of meso-porous structure, serving as a cathode, with a sufficient current density for a sufficient period of time to electrochemically deposit nano-scaled sulfur particles or coating in said meso-pores to form said pre-sulfurized active cathode layer, wherein said particles or coating have a thickness or diameter smaller than 3 nm and occupy a weight fraction of greater than 80% based on the total weights of said sulfur particles or coating and said integral layer combined, have a thickness or diameter smaller than 5 nm and occupy a weight fraction of greater than 90% based on the total weights of said sulfur particles or coating and said integral layer combined, or have a thickness or diameter smaller than 10 nm and occupy a weight fraction of greater than 95% based on the total weights of said sulfur particles or coating and said integral layer combined; and
  (e) depositing an element Z to said meso-porous structure and said Z element is selected from Sn, Sb, and/or Bi.

2. The method of claim 1, wherein said sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

3. The method of claim 1, wherein said anode comprises an anode active material selected from an alkali metal, an alkaline metal, a transition metal, a metal from groups 13 to 17 of the periodic table, or a combination thereof.

4. The method of claim 2, wherein said metal element M is selected from Li, Na, K, Mg, Zn, Cu, Ti, Ni, Co, Fe, or Al.

5. The method of claim 2, wherein said $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

6. The method of claim 1, wherein said element Z is mixed with sulfur or formed as discrete Z coating or particles having a dimension less than 100 nm, and the weight of Z is less than the weight of sulfur.

7. The method of claim 6, wherein said procedure of depositing element Z includes electrochemical deposition, chemical deposition, or solution deposition.

8. The method of claim 1, wherein said electrolyte further comprises a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl) imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

9. The method of claim 1, wherein said solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

10. An electrochemical method of producing a pre-sulfurized active cathode layer for a rechargeable alkali metal-sulfur cell, said method comprising:
(a) preparing an integral layer of a meso-porous structure of a carbon, graphite, metal, or conductive polymer, wherein said meso-porous structure comprises meso-scaled pores of 2-50 nm and a specific surface area greater than 100 $m^2/g$ and wherein said carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nanofiber, chemically activated carbon nanotube, chemically treated carbon fiber, chemically activated graphite fiber, chemically activated carbonized polymer fiber, chemically treated coke, activated mesophase carbon, meso-porous carbon, electro-spun conductive nanofiber, highly separated vapor-grown carbon or graphite nanofiber, highly separated carbon nanotube, carbon nanowire, metal nanowire, metal-coated nanowire or nanofiber, conductive polymer-coated nanowire or nanofiber, or a combination thereof, and wherein said meso-porous structure comprises 0-49% by weight of sulfur or sulfur-containing compound pre-loaded therein and an optional binder material of 0-10% by weight;
(b) preparing an electrolyte comprising a non-aqueous solvent and a sulfur source dissolved or dispersed in said solvent, wherein said sulfur source is selected from $M_xS_y$ and said M is a metal element selected from Na, K, Mg, Zn, Cu, Ti, Ni, Co, Fe, or Al;
(c) preparing an anode;
(d) bringing said integral layer of meso-porous structure and said anode in ionic contact with said electrolyte and imposing an electric current between said anode and said integral layer of meso-porous structure, serving as a cathode, with a sufficient current density for a sufficient period of time to electrochemically deposit nano-scaled sulfur particles or coating in said meso-pores to form said pre-sulfurized active cathode layer, wherein said particles or coating have a thickness or diameter smaller than 20 nm;
wherein said anode, said electrolyte, and said integral layer of meso-porous structure are disposed in an external container outside of said rechargeable alkali metal-sulfur cell and said step of electrochemically depositing nano-scaled sulfur particles or coating in said meso-scaled pores is conducted outside said rechargeable alkali metal-sulfur cell; and
(e) incorporating said pre-sulfurized active cathode layer in said rechargeable alkali metal-sulfur cell.

11. The method of claim 10, wherein said nano-scaled sulfur particles or coating occupy a weight fraction of at least 70% based on the total weights of said sulfur particles or coating and said carbon, graphite, metal or polymer material combined.

12. The method of claim 10, wherein said nano-scaled sulfur particles or coating occupy a weight fraction of at least 80%.

13. The method of claim 10, wherein said nano-scaled sulfur particles or coating occupy a weight fraction of at least 90%.

14. The method of claim 10, wherein said nano-scaled sulfur particles or coating have a thickness or diameter smaller than 10 nm.

15. The method of claim 10, wherein said nano-scaled sulfur particles or coating have a thickness or diameter smaller than 5 nm.

16. The method of claim 10, wherein said nano-scaled sulfur particles or coating have a thickness or diameter smaller than 3 nm.

* * * * *